(12) United States Patent
Yang et al.

(10) Patent No.: US 9,676,302 B2
(45) Date of Patent: Jun. 13, 2017

(54) ADJUSTABLE FOOTREST ASSEMBLY AND CAR SAFETY SEAT

(71) Applicant: National Tsing Hua University, Hsinchu (TW)

(72) Inventors: Chien Yang, Taitung County (TW); Te-Hung Chen, Taipei (TW); Mao-Jiun Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 122 days.

(21) Appl. No.: 14/886,107

(22) Filed: Oct. 19, 2015

(65) Prior Publication Data

US 2017/0043682 A1    Feb. 16, 2017

(30) Foreign Application Priority Data

Aug. 11, 2015  (TW) .............................. 104126164 A

(51) Int. Cl.
*B60N 2/28* (2006.01)
*A47C 7/50* (2006.01)
*A47C 7/52* (2006.01)
*A47D 15/00* (2006.01)

(52) U.S. Cl.
CPC ............... *B60N 2/28* (2013.01); *A47C 7/506* (2013.01); *A47C 7/52* (2013.01); *A47D 15/00* (2013.01); *B60N 2/2881* (2013.01)

(58) Field of Classification Search
None
See application file for complete search history.

(56) References Cited

U.S. PATENT DOCUMENTS

| 3,910,573 | A | * | 10/1975 | Jamba ................ A63B 21/0023 482/91 |
| 4,013,318 | A | | 3/1977 | Piper |
| 4,157,593 | A | * | 6/1979 | Kristensson ......... A61G 7/1019 5/87.1 |
| 6,264,278 | B1 | | 7/2001 | Weimer et al. |
| 6,860,557 | B2 | | 3/2005 | Jonasson |
| 7,322,655 | B1 | | 1/2008 | Williams et al. |

(Continued)

FOREIGN PATENT DOCUMENTS

| CN | 201849337 | 6/2011 |
| CN | 203995798 | 12/2014 |

(Continued)

OTHER PUBLICATIONS

"Office Action of Taiwan Counterpart Application", issued on Jun. 7, 2016, p. 1-p. 4, in which the listed references were cited.

*Primary Examiner* — David E Allred
(74) *Attorney, Agent, or Firm* — Jianq Chyun IP Office

(57) ABSTRACT

An adjustable footrest assembly adapted to a car safety seat is provided. The car safety seat includes a seat body. The adjustable footrest assembly includes a footrest and two flexible connection structures. The two flexible connection structures are connected to two ends of the footrest. The footrest is adapted to be connected to the seat body through the two flexible connection structures, and a length of each of the flexible connection structures is adapted to be adjusted to change a distance between the footrest and the seat body. In addition, a car safety seat having the adjustable footrest assembly is also provided.

18 Claims, 4 Drawing Sheets

(56) References Cited

U.S. PATENT DOCUMENTS

| | | | |
|---|---|---|---|
| 8,191,913 B1 * | 6/2012 | Jessome | A61G 5/12 |
| | | | 280/250.1 |
| 9,233,034 B2 * | 1/2016 | Storm | A61G 5/10 |
| 2009/0194975 A1 * | 8/2009 | Harrison | A47C 4/286 |
| | | | 280/649 |
| 2012/0080912 A1 * | 4/2012 | Perera | A47C 7/52 |
| | | | 297/188.01 |
| 2015/0137575 A1 | 5/2015 | Millasseau | |

FOREIGN PATENT DOCUMENTS

| | | | | |
|---|---|---|---|---|
| GB | 227054 A | * | 1/1925 | A47D 13/105 |
| GB | 509506 A | * | 7/1939 | A47C 16/02 |
| GB | 689275 A | * | 3/1953 | A47C 20/022 |
| GB | 2235368 A | * | 3/1991 | A47C 7/506 |
| TW | M270943 | | 7/2005 | |
| TW | 200535035 | | 11/2005 | |
| TW | M298535 | | 10/2006 | |

* cited by examiner

ADJUSTABLE FOOTREST ASSEMBLY AND CAR SAFETY SEAT

CROSS-REFERENCE TO RELATED APPLICATION

This application claims the priority benefit of Taiwan application serial no. 104126164, filed on Aug. 11, 2015. The entirety of the above-mentioned patent application is hereby incorporated by reference herein and made a part of this specification.

BACKGROUND OF THE INVENTION

Field of the Invention

The invention relates to a footrest assembly and a car safety seat, and specifically relates to an adjustable footrest assembly and a car safety seat having the same.

Description of Related Art

The safety belt attached on the car seat is mainly designed for the adult body, so that it is unable to provide safety and protection for children, and thus the car safety seat suitable for children is gradually developed. The car safety seat is generally mounted on the backseat of the car so as to provide seats for children, and the car safety seat can position the body of children effectively. In order to increase the comfort for children while sitting on the car safety seat, some of the car safety seats have a footrest for children to place their feet.

However, the distance between the seat body and the footrest of the normal car safety seat cannot be adjustable. Therefore, along with the development of the body size, children will feel uncomfortable when placing two feet on the footrest because there is not enough space for stretching, so as to affect the normal bone development of children. Furthermore, when the car moves, the two feet of the child are subject to an excessive force from the footrest because of the acceleration or deceleration of the car, so as to cause the children's feet being injured or discomfortable. In addition, the weight and volume of the footrest of the car safety seat is too big, so as to make the footrest difficult to carry and to store.

SUMMARY OF THE INVENTION

The invention provides an adjustable footrest assembly, which can make a child more comfortable while sitting on a car safety seat, and the adjustable footrest assembly is easy to carry and store.

The invention provides a car safety seat, which has an adjustable footrest assembly to make a child more comfortable while sitting on the car safety seat, and the adjustable footrest assembly is easy to carry and store.

The adjustable footrest assembly of the invention is adapted to a car safety seat. The car safety seat includes a seat body. The adjustable footrest assembly includes a footrest and two flexible connection structures. The two flexible connection structures are respectively connected to two ends of the footrest. The footrest is adapted to be connected to the seat body through the two flexible connection structures, and a length of each of the flexible connection structures is adapted to be adjusted to change a distance between the footrest and the seat body.

The car safety seat of the invention includes a seat body and an adjustable footrest assembly. The adjustable footrest assembly includes a footrest and two flexible connection structures. The two flexible connection structures are respectively connected to two ends of the footrest. The footrest is adapted to be connected to the seat body through the two flexible connection structures, and a length of each of the flexible connection structures is adapted to be adjusted to change a distance between the footrest and the seat body.

In one embodiment of the invention, the adjustable footrest assembly further includes a cushion pad, wherein the cushion pad is disposed on the footrest.

In one embodiment of the invention, the footrest is adapted to swing relatively to the seat body through the flexibility of the two flexible connection structures.

In one embodiment of the invention, each of the flexible connection structures has a plurality of scales, the lengths of the two flexible connection structures are adapted to be adjusted to be identical according to the scales.

In one embodiment of the invention, each of the flexible connection structures is adapted to be detachably connected to the seat body.

In one embodiment of the invention, the adjustable footrest assembly includes two retaining belts, wherein the two retaining belts are respectively fixed at two sides of the seat body, each of the retaining belts and the seat body form a through hole therebetween, and each of the flexible connection structures is adapted to pass through the corresponding through hole and to be hung on the seat body.

In one embodiment of the invention, an end part of each of the flexible connection structures is adapted to pass through the corresponding through hole and to be fixed to other parts of the flexible connection structure.

In one embodiment of the invention, each of the flexible connection structures has a velcro at the end part, the end part is adapted to attach to other parts of the flexible connection structure via the velcro.

In one embodiment of the invention, the footrest has two slots, the two flexible connection structures pass through the two slots respectively to be fixed to the footrest.

Based on the above, in the adjustable footrest assembly of the invention, the length of each of the flexible connection structures can be adjusted to change the distance between the footrest and the seat body corresponding to the body size in growth process of a child, so that the child can sit on the car safety seat comfortably without feeling unwell because of the long ride or affecting the normal bone development. Furthermore, by means of flexibility, the flexible connection structure makes the footrest be able to swing when the car accelerates or decelerates, so as to prevent the two feet of the child from being subject to an excessive force from the footrest because of the acceleration or deceleration of the car. In addition, the flexible connection structure can be made of lightweight materials such as fabric or leather, and can be folded, so as to reduce the weight and volume of the adjustable footrest assembly, such that the adjustable footrest assembly is lighter and easier to carry and to store.

In order to make the aforementioned and other features and advantages of the invention more comprehensible, embodiments accompanying figures are described in detail bellows.

DESCRIPTION OF THE EMBODIMENTS

Figure 1:
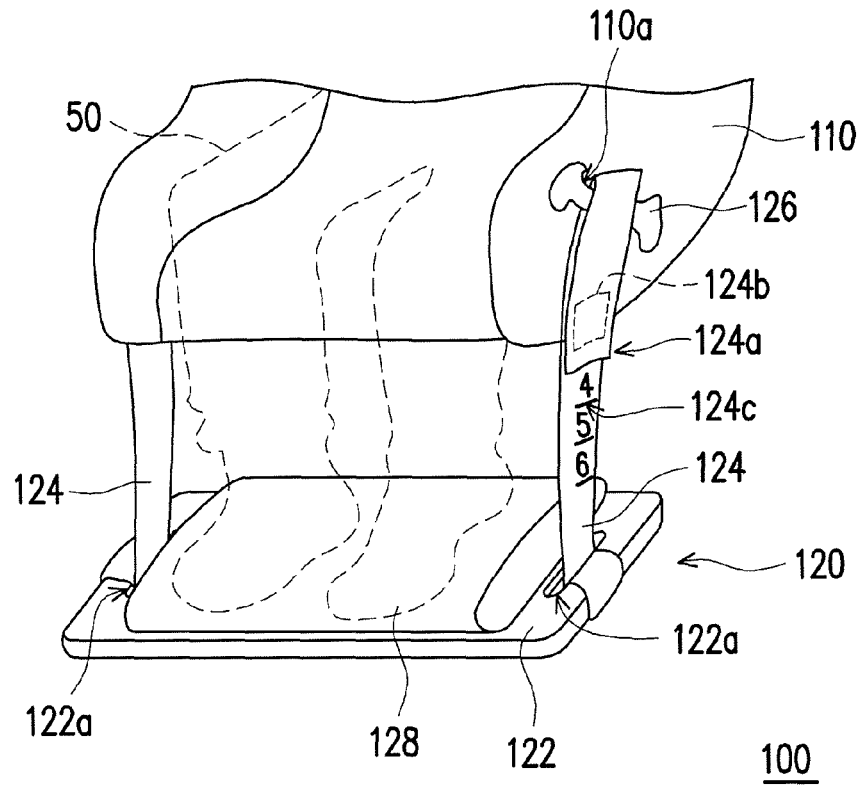
FIG. 1 is a schematic view of a car safety seat of one embodiment of the invention.
Figure 2:
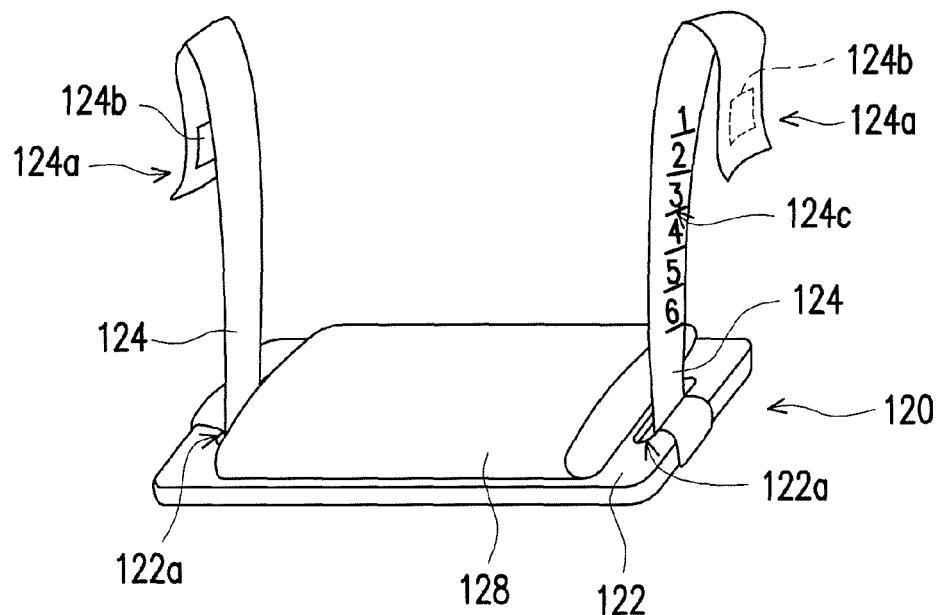
FIG. 2 is a schematic view of part of the components of an adjustable footrest assembly in FIG. 1.

FIG. 1 is a schematic view of a car safety seat of one embodiment of the invention. FIG. 2 is a schematic view of part of the components of an adjustable footrest assembly in FIG. 1. Referring to FIG. 1 and FIG. 2, the car safety seat 100 of the present embodiment includes a seat body 110 and an adjustable footrest assembly 120. The seat body 110 can be mounted on the backseat of the car so as to provide a seat for a child 50. The adjustable footrest assembly 120 includes a footrest 122 and two flexible connection structures 124. The two flexible connection structures 124 are, for example, made of soft materials such as fabric or leather and respectively connected to two ends of the footrest 122. The footrest 122 is connected to the seat body 110 through the two flexible connection structures 124, and the length of each of the flexible connection structures 124 is adapted to be adjusted to change the distance between the footrest 122 and the seat body 110.

Figure 3:
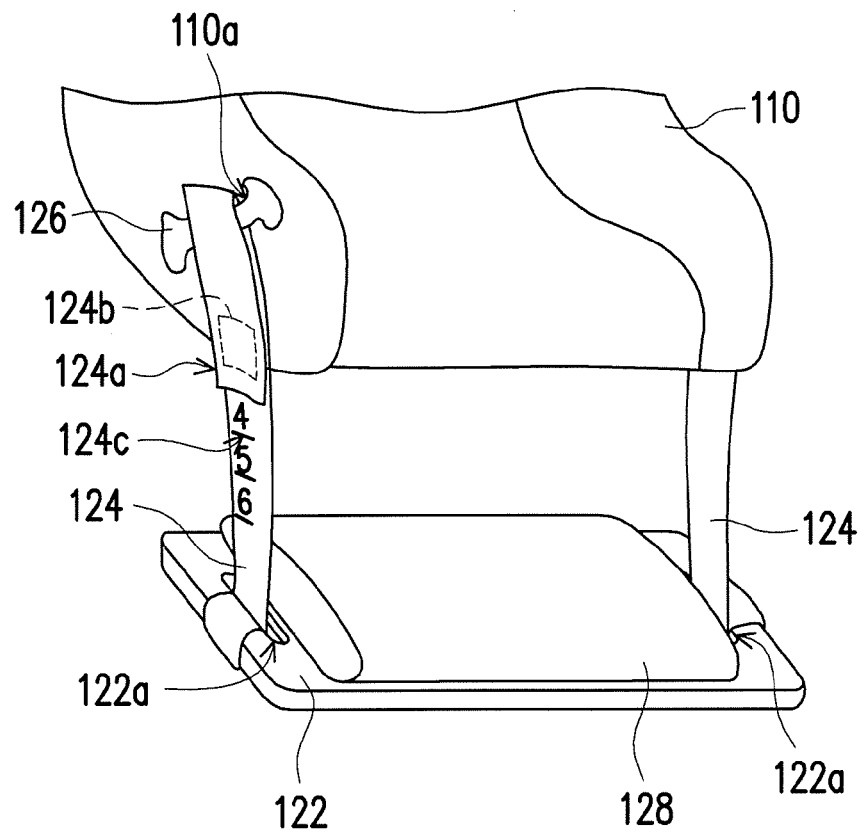
FIG. 3 is a schematic view at a different angle of the car safety seat in FIG. 1.

FIG. 3 is a schematic view at a different angle of the car safety seat in FIG. 1. Referring to FIG. 1 and FIG. 3, specifically, the adjustable footrest assembly 120 of the present embodiment includes two retaining belts 126 (respectively indicated in FIG. 1 and FIG. 3), the two retaining belts 126 are respectively fixed to two sides of the seat body 110 and each of the retaining belts 126 and the seat body 110 form a through hole 110a therebetween. An end part 124a of each of the flexible connection structures 124 has a velcro 124b, and the end part 124a passes through the corresponding through hole 110a and is attached to be fixed to other parts of the flexible connection structure 124 via the velcro 124b, so that the flexible connection structure 124 can be detachably hung on the seat body 110. The user can pull the end part 124a of the flexible connection structure 124 in a state that the velcro 124b is not attached to be fixed, so as to adjust the length of the flexible connection structure 124 between the retaining belt 126 and the footrest 122, and the velcro 124b is used to fix the flexible connection structure 124 after the length of the flexible connection structure 124 is completely adjusted.

According to the above-mentioned disposition method of the adjustable footrest assembly 120, the length of each of the flexible connection structures can be adjusted to change the distance between the footrest 122 and the seat body 110 corresponding to the body size in growth process of the child 50, so that the child 50 can sit on the car safety seat 100 comfortably without feeling unwell because of the long ride or affecting the normal bone development. Furthermore, by means of flexibility, the flexible connection structure 124 makes the footrest 122 be able to swing relatively to the seat body 110 when the car accelerates or decelerates, so as to prevent the two feet of the child 50 from being subject to an excessive force from the footrest 122 because of the acceleration or deceleration of the car. In addition, the flexible connection structure 124 can be made of lightweight materials such as fabric or leather, and can be folded, so as to reduce the weight and volume of the adjustable footrest assembly 120, such that the adjustable footrest assembly 120 is lighter and easier to carry and to store. In other embodiments, other appropriate methods can be used to connect the flexible connection structure 124 to the seat body 110 and to adjust the length of the flexible connection structure 124, the invention is not limited thereto.

In the present embodiment, the material of the footrest 122 is, for example, acrylic or other appropriate hard materials which have a better structural strength. The footrest 122 has two slots 122a, the two flexible connection structures 124 pass through the two slots 122a respectively to be fixed to the footrest 122. In other embodiments, the flexible connection structure 124 can be connected to the footrest 122 via other appropriate methods, the invention is not limited thereto.

In addition, the adjustable footrest assembly 120 further includes a cushion pad 128, the cushion pad 128 is disposed on the footrest 122 to provide for the child to trample on. The shape of the cushion pad 128 is only shown schematically in FIG. 1 and FIG. 2, other appropriate shapes can be applied. The cushion pad 128 is, for example, fixed to the footrest 122 by adhesive bonding, hooking, inserting, or other appropriate methods, and the material of the cushion pad 128 is, for example, foam, inflatable material, or other materials which have appropriate elastic deformation and resilience abilities, the invention is not limited thereto.

In this embodiment, each of the flexible connection structures 124 has a plurality of scales 124c, the scales 124c of the two flexible connection structures 124 are symmetrical, wherein the scales 124c are, for example, visual markers, such as letter and symbol, which are formed on the flexible connection structure 124, the invention is not limited to the forms thereof. The user can adjust the lengths of the two flexible connection structures 124 to be identical according to the scales 124c, so as to prevent the lengths of the two flexible connection structures 124 from being different to cause the heights of two ends of the footrest 122 being different.

Figure 4A:
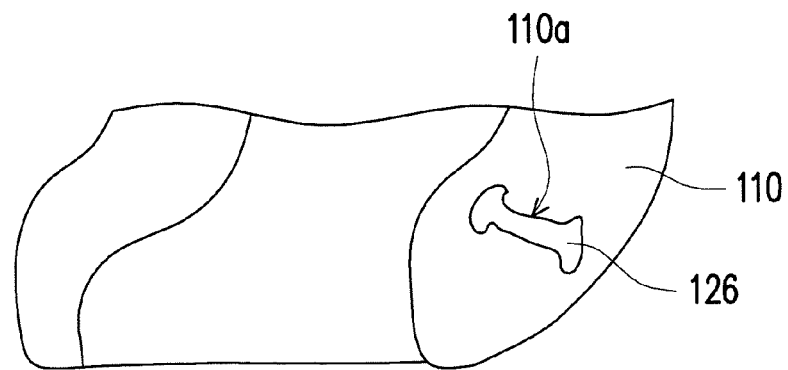
FIG. 4A to FIG. 4C depict an installing process of the adjustable footrest assembly in FIG. 1.
Figure 4B:
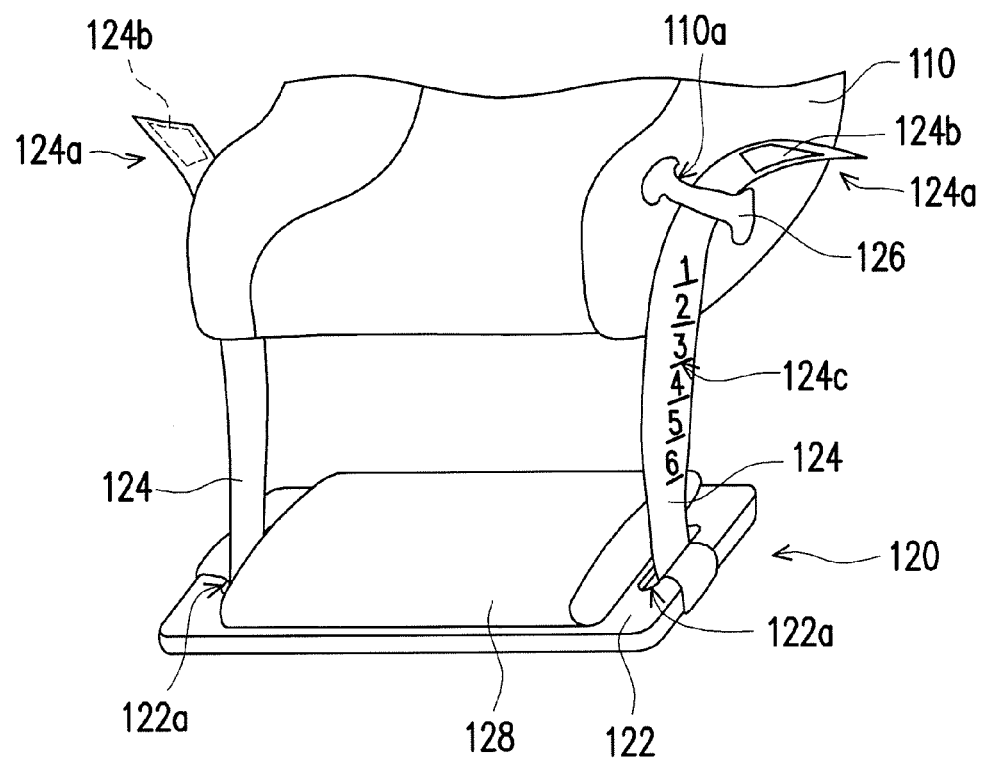
Figure 4C:
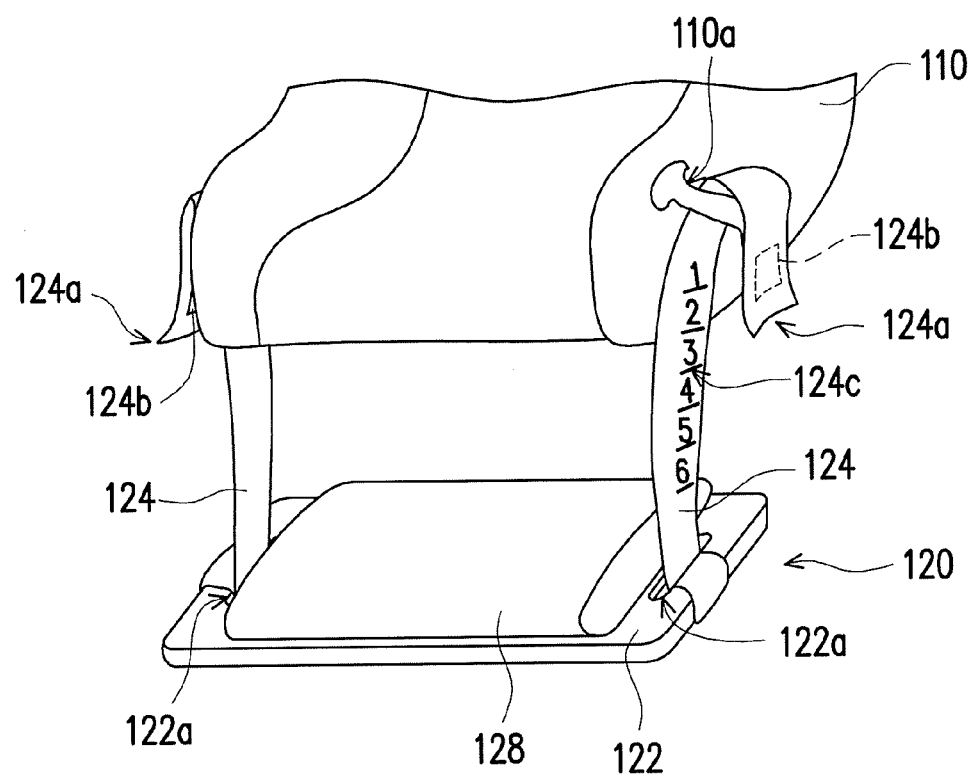

The installing method of the adjustable footrest assembly of the present embodiment is described via drawings as following. FIG. 4A to FIG. 4C depict an installing process of the adjustable footrest assembly in FIG. 1. Firstly, fixing the retaining belt 126 on the seat body 110 as shown in FIG. 4A. Subsequently, passing the end part 124a of each of the flexible connection structures 124 through the through hole 110a between the retaining belt 126 and the seat body 110 as shown in FIG. 4B. After that, folding the end part 124a of each of the flexible connection structures 124 downwards, and attaching the end part 124a of the flexible connection structures 124 to the appropriate scale 124c on the flexible connection structures 124 via the velcro 124b as shown in FIG. 4C, and the installing of the adjustable footrest assembly 120 is completed as shown in FIG. 1.

In summary, in the adjustable footrest assembly of the invention, the length of each of the flexible connection structures can be adjusted to change the distance between the footrest and the seat body corresponding to the body size in growth process of the child, so that the child can sit on the car safety seat comfortably without feeling unwell because of the long ride or affecting the normal bone development. Furthermore, by means of flexibility, the flexible connection structure makes the footrest be able to swing when the car accelerates or decelerates, so as to prevent the two feet of the child from being subject to the excessive force from the footrest because of the acceleration or deceleration of the car. In addition, the flexible connection structure can be made of lightweight materials such as fabric or leather, and can be folded, so as to reduce the weight and volume of the adjustable footrest assembly, such that the adjustable footrest assembly is lighter and easier to carry and to store. Otherwise, each of flexible connection structures can have scales, the user can adjust the lengths of the two flexible connection structures to be identical according to the scales, so as to prevent the lengths of the two flexible connection structures from being different to cause the heights of two ends of the footrest being different.

Although the present invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. An adjustable footrest assembly, adapted to a car safety seat, wherein the car safety seat comprises a seat body, the adjustable footrest assembly comprises:
   a footrest; and
   two flexible connection structures, respectively connected to two ends of the footrest, wherein the footrest is adapted to be connected to the seat body through the two flexible connection structures, and a length of each of the flexible connection structures is adapted to be adjusted to change a distance between the footrest and the seat body;
   wherein each of the two flexible connection structures comprises a scale with a plurality of markings showing adjustment positions along a length of the flexible connection structures, wherein each of the flexible connection structures forms a loop by being doubled back on itself such that an end part of each flexible connection structure is selectively and removably fixed to other parts of the flexible connection structure at selected markings on the scale to adjust an effective length of the flexible connection structures.

2. The adjustable footrest assembly as recited in claim 1, further comprising a cushion pad, wherein the cushion pad is disposed on the footrest.

3. The adjustable footrest assembly as recited in claim 1, wherein the footrest is adapted to swing relatively to the seat body through a flexibility of the two flexible connection structures.

4. The adjustable footrest assembly as recited in claim 1, wherein the lengths of the two flexible connection structures are adapted to be adjusted to be identical according to the scales.

5. The adjustable footrest assembly as recited in claim 1, wherein each of the flexible connection structures is adapted to be detachably connected to the seat body.

6. The adjustable footrest assembly as recited in claim 1, comprising two retaining belts, wherein the two retaining belts are adapted to be respectively fixed at two sides of the seat body, each of the retaining belts and the seat body form a through hole therebetween, and each of the flexible connection structures is adapted to pass through a corresponding one of the through holes of the seat body to be hung on the seat body.

7. The adjustable footrest assembly as recited in claim 6, wherein the end part of each of the flexible connection structures is adapted to pass through the corresponding through hole and to be fixed to the other parts of the flexible connection structure.

8. The adjustable footrest assembly as recited in claim 7, wherein each of the flexible connection structures has one of a hook and a loop structure at the end part, the end part is adapted to attach to the other of the hook and loop structure on the other parts of the flexible connection structure.

9. The adjustable footrest assembly as recited in claim 1, wherein the footrest has two slots, the two flexible connection structures pass through the two slots respectively to be fixed to the footrest.

10. A car safety seat, comprising:
    a seat body; and
    an adjustable footrest assembly, comprising:
       a footrest; and
       two flexible connection structures, respectively connected to two ends of the footrest, wherein the footrest is connected to the seat body through the two flexible connection structures, and a length of each of the flexible connection structures is adapted to be adjusted to change a distance between the footrest and the seat body;
    wherein each of the two flexible connection structures comprises a scale with a plurality of markings showing adjustment positions along a length of the flexible connection structures, wherein each of the flexible connection structures forms a loop by being doubled back on itself such that an end part of each flexible connection structure is selectively and removably fixed to other parts of the flexible connection structure at selected markings on the scale to adjust an effective length of the flexible connection structures.

11. The car safety seat as recited in claim 10, wherein the adjustable footrest assembly further comprises a cushion pad, the cushion pad is disposed on the footrest.

12. The car safety seat as recited in claim 10, wherein the footrest is adapted to swing relatively to the seat body through a flexibility of the two flexible connection structures.

13. The car safety seat as recited in claim 10, wherein the lengths of the two flexible connection structures are adapted to be adjusted to be identical according to the scales.

14. The car safety seat as recited in claim 10, wherein each of the flexible connection structures is detachably connected to the seat body.

15. The car safety seat as recited in claim 10, wherein the adjustable footrest assembly comprises two retaining belts, the two retaining belts are respectively fixed at two sides of the seat body, each of the retaining belts and the seat body form a through hole therebetween, and each of the flexible connection structures is adapted to pass through a corresponding one of the through holes of the seat body to be hung on the seat body.

16. The car safety seat as recited in claim 15, wherein the end part of each of the flexible connection structures is adapted to pass through the corresponding through hole and to be fixed to the other parts of the flexible connection structure.

17. The car safety seat as recited in claim 16, wherein each of the flexible connection structures has one of a hook and loop structure at the end part, the end part is adapted to attach to the other of the hook and loop structure on the other parts of the flexible connection structure.

18. The car safety seat as recited in claim 10, wherein the footrest has two slots, the two flexible connection structures pass through the two slots respectively to be fixed to the footrest.

* * * * *